Nov. 18, 1947.                L. W. BUELL                 2,431,025
                        SPLIT PHASE MOTOR CONTROL
                Filed Oct. 4, 1944             2 Sheets—Sheet 1

Lewis W. Buell
Inventor
Haynes and Koenig
Attorneys

Patented Nov. 18, 1947

2,431,025

UNITED STATES PATENT OFFICE 2,431,025

SPLIT PHASE MOTOR CONTROL

Lewis W. Buell, Rehoboth, Mass., assignor to Metals & Controls Corporation, Attleboro, Mass., a corporation of Massachusetts Application October 4, 1944, Serial No. 557,181

3 Claims. (Cl. 172—279)

This invention relates to split phase motor controls.

Among the objects of this invention are the provision of improved motor controls for automatically cutting out the starting winding of a motor; the provision of a cutout for electric motors which may be located remote from the motor; the provision of a cutout which has approximately similar operating characteristics under varying line voltages; the provision of a cutout which may be easily adjusted for operation at different voltages; and the provision of a cutout which is sturdily constructed and reliable in operation. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a top plan of a device constructed in accordance with the present invention with the cover removed;

Similar reference characters indicate corresponding parts throughout the several views of the drawings.

Figure 1:
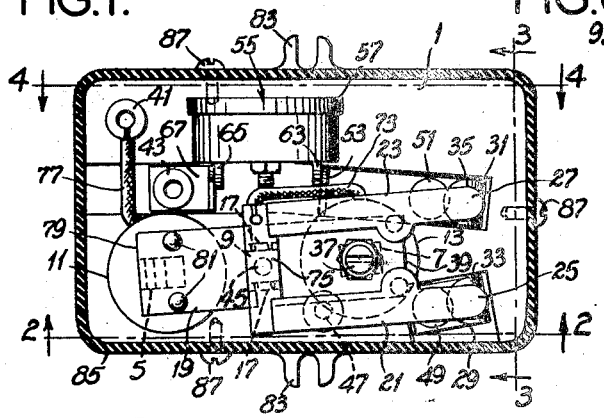

Electric motors are frequently constructed with both main and phase windings. The main and the phase windings are connected while the motor is being started, but after the motor comes up to speed the phase or starting winding is cut out and the main or running winding keeps the motor in operation. So-called motor cutouts of various types have been provided for cutting the phase winding out of the circuit when the motor comes up to speed. These cutouts, particularly when of the centrifugal type, are customarily mounted on the motor or form part of the motor itself.

For certain purposes, such as for hermetically sealed motors, it is desirable to locate the cutout at a distance from the motor. This obviates the necessity for hermetically sealing the cutout with the motor and makes it possible conveniently to repair the cutout when needed.

Although efficient cutouts are available for incorporation with the motor, cutouts for remote location from the motor have not proved satisfactory. It has been found, for example, that certain non-mechanical types of cutouts which utilize a single electromagnetic coil, when set to operate at a given phase voltage, operate at widely varying motor speeds, depending upon the line voltage.

Referring now to the drawings, numeral 1 designates a base on which is mounted, by means of bolt 45, an E-shaped laminated core member 3. This member has outer arms 5 and 7, and a central arm 9. Arms 5 and 7 constitute the cores of voltage coils 11 and 13, respectively. Arm 9 is elongated beyond arms 5 and 7 and attached thereto by bolts 14 is a support 15. Support 15 receives the narrow central portion 17 of an armature bar 19 which pivotally rests on the top of arm 9. A pair of flexible arms 21 and 23 are mounted at one end on support 15. Arms 21 and 23 carry at their opposite ends contact buttons 25 and 27, respectively. Also mounted on base 1 are a pair of supporting angles 29 and 31. These carry at their opposite ends contact buttons 33 and 35, respectively, which in turn cooperate with buttons 25 and 27, respectively.

An adjusting screw 37 is located in one end of the armature bar 19. This adjusting screw, upon change of location, alters the magnetic gap between the end 39 of bar 19 and the core 7 of coil 13.

Terminals 41, 43, 47, 49 and 51 are likewise attached to base 1. Terminal 49 is connected to and attaches support 29 to base 1. Terminal 51 attaches support 31 to base 1. Support 31 is extended to form a bracket 53 to which is attached electrically a motor protection thermostatic assembly 55. This consists of a base 57 having an upstanding edge 59 within which is located a snap-acting thermostatic disc 61. Base 57 has mounted thereon contact buttons 62 and 64 (see Fig. 6) which are electrically connected to terminals 63 and 65, and a heater 60. Disc 61 carries cooperating contact buttons (not shown). The construction and operation of such overload motor protective thermostatic controls is known to the art, and will not be further described herein.

Terminal 65 is attached to conducting bracket 67 which in turn is attached to base 1 by terminal 43.

Electrical connections are made by wire 69 from coil 11 to terminal 47, by wire 71 from coil 13 to terminal 47, by wire 73 from the other side of coil 13 to a connecting bar 75 between arms 21 and 23, and by wire 77 from the other side of coil 11 to terminal 41.

Bar 19, it will be noted, is sufficiently wide at the end 39 thereof to overlap arms 21 and 23. The distance between the end of core 5 and bar 19, as located by the support 9, is such that when the end 79 of bar 19 is brought into contact with the end of arm 5, the end 39 of bar 19 forces arms 21 and 23 upward, separating contacts 25 and 33, and 27 and 35, respectively.

Bar 19 is shown constructed of a plurality of laminations of a suitable magnetic material. These laminations are held together by rivets 81. Ears 83 are attached to cover 85 so that the assembly may be mounted as desired, and a cover 85 attached to base 1 by bolts 87, protects the mechanism. Core 5 is provided with a shading coil 88.

Figure 6:
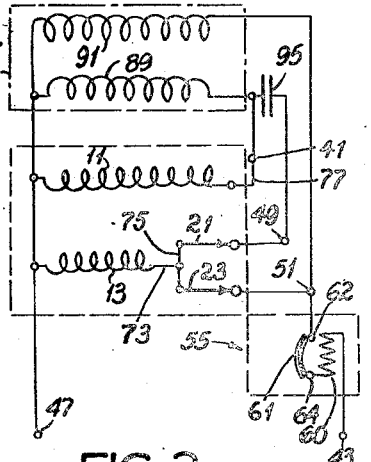
Fig. 6 is a diagram of the electrical connections of Figs. 1–5 cutout.

The manner in which the device is connected is illustrated in Fig. 6. Terminal 47 is connected not only to coils 11 and 13 but also to the phase winding 89 and main winding 91 of a motor 93. A condenser 95 is preferably connected to the opposite side of phase winding 89. Terminal 41 is connected to the other side of phase winding 89 between the end of the winding and condenser 95, while terminal 49 is connected to condenser 95. Terminal 51 is connected to the other side of main winding 91. Terminals 47 and 43 are connected to a source of power.

Figure 2:
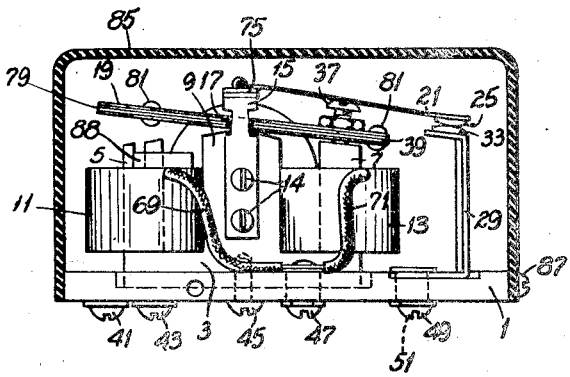
Fig. 2 is a section on the line 2—2 of Fig. 1.
Figure 3:
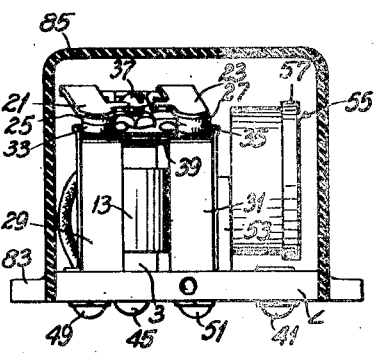
Fig. 3 is a section on the line 3—3 of Fig. 1.
Figure 4:
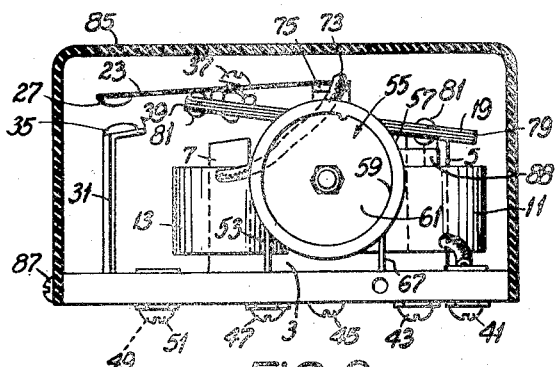
Fig. 4 is a section on the line 4—4 of Fig. 1.
Figure 5:
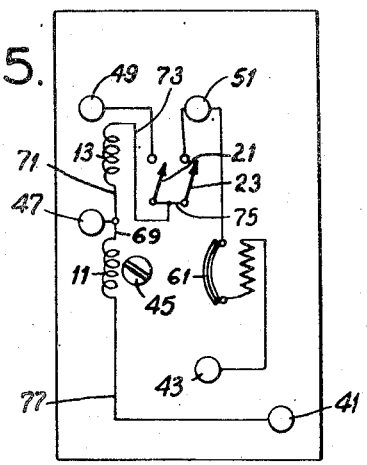
Fig. 5 is a bottom plan with the connections diagrammatically illustrated.

The operation of the device is as follows:

Figs. 1–3 illustrate the condition of the device when the motor is not running. Assuming now that current is applied across terminals 47 and 43, it flows to coils 11 and 13 and to both phase winding 89 and main winding 91 of motor 93. The motor thereupon starts. When the motor speed reaches a predetermined value, dependent upon the adjustment of adjusting screw 37, the coil 11 is excited sufficiently to overpower the effect of coil 13 and the bias of the armature 19 toward said coil 13. This pulls the end 79 of bar 19 into contact with the end of core 5. The end 39 of bar 19 is thereby brought into contact with arms 21 and 23 and moves them to the Fig. 4 position. This separates contact buttons 25 and 27, and 33 and 35, respectively. This breaks the circuit to coil 13 and phase winding 89. Main winding 91 remains in the circuit so that operation of the motor continues until the main circuit is broken or until, upon the passage of deleteriously high current, disc 61 is heated sufficiently to snap to a position of opposite curvature, breaking the circuit. The circuit to coil 13 and to phase winding 89 is kept open by coil 11, while the motor operates, but if the motor is shut off for any reason bar 19 assumes its Figs. 1–3 position by its gravity bias. Upon subsequently closing the circuit the cycle is repeated.

Figure 7:
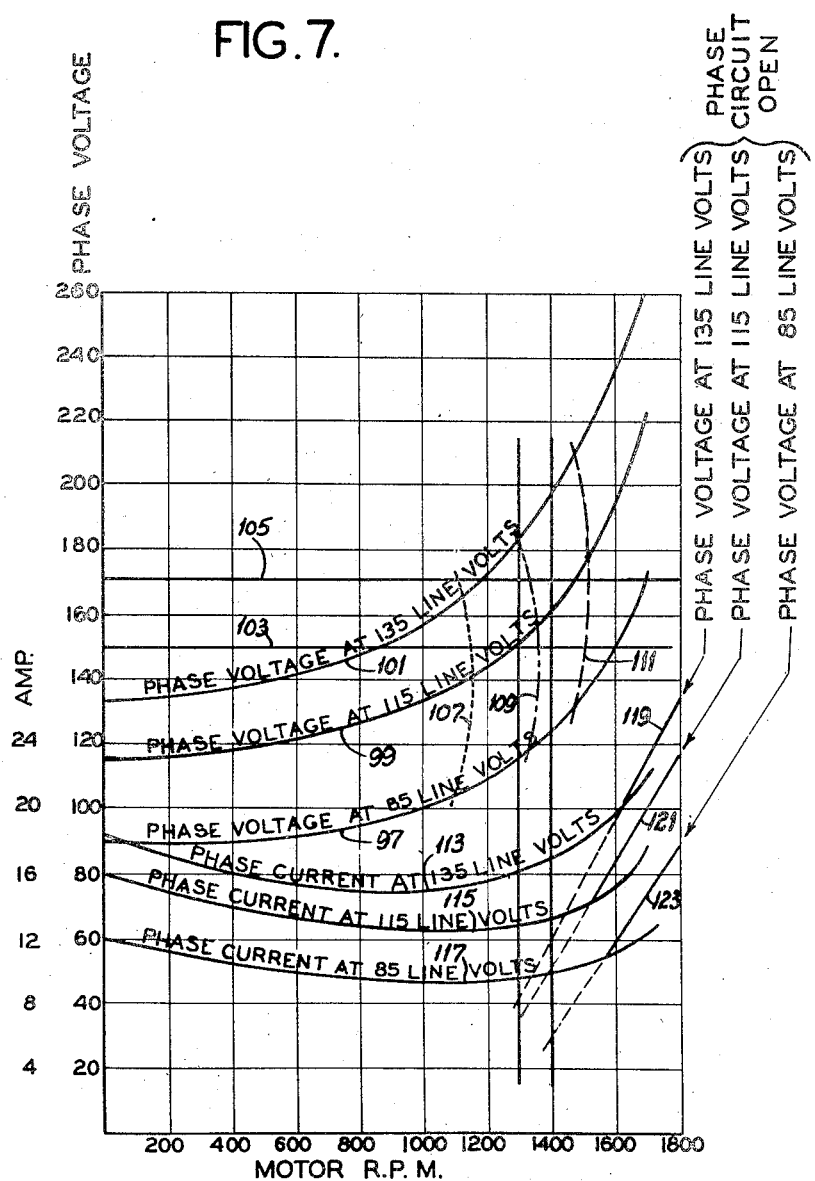
Fig. 7 is a graph illustrating the operation of the cutout as applied to a specific motor.

Fig. 7 illustrates many of the important advantages obtained with the present cutout. It is a graphic representation of the operation of a specific ½ horsepower motor on line voltages of 85 volts, 115 volts and 135 volts. It is known that line voltages are often not constant and that wide fluctuations, as extensive as between 85 and 135 volts, are not unknown.

Curve 97 depicts the change in the phase voltage of this ½ horsepower motor, upon starting, with both the phase and main windings carrying current and with a line voltage of 85 v. The phase voltage increases as indicated with increase in the speed of the motor. Curve 99 represents the phase voltage increase with increasing speed for a line voltage of 115 volts, while curve 101 illustrates the increase in phase voltage of this motor with a line voltage of 135 volts.

The previously known remotely located cut-outs were as stated above, set to operate either at a specific phase voltage or within a narrow range. Such a range is indicated by lines 103 and 105 on the graph. Following these lines, it will be noted that the speed of the motor at which the phase winding is cut out varies greatly, dependent upon the existing line voltage, when cutouts are employed of the old type indicated. For example, if the cutout is set to operate at a phase voltage of 150 volts it will be noted that the cutout will operate, when the line voltage is 135 volts, at a motor speed of approximately 900 R. P. M. When the line voltage is 115 volts such a cutout will not operate until the motor has reached a speed of about 1260 R. P. M., while if the line voltage is only 85 volts the cutout will not operate until the motor speed has reached approximately 1680 R. P. M. Such a variation in operating characteristics is highly undesirable and may even result in stopping the rotor when the cutout operates at an unduly low motor speed.

The dotted lines 107, 109 and 111 depict the motor speeds at which the herein disclosed cut-out will operate for three different settings of adjusting screw 37. It will be noted that not only may the phase voltage at which the cutout operates be easily varied by the simple adjustment of screw 37, but more important, for a given adjustment the motor speed at which the cutout operates is approximately the same even though the line voltage is varied between 85 and 135 volts.

The present cutout therefore provides improved operating characteristics and makes possible the adjustment of the cutout to operate at a desired motor speed, irrespective of the line voltage.

Curves 113, 115 and 117 illustrate the phase current for line voltages between 85 and 135 volts for different motor speeds. Lines 119, 121 and 123 illustrate the phase voltage for varying line voltages between 85 and 135 volts, when the phase circuit is open.

Figure 8:
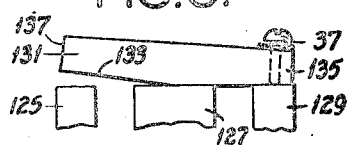
Fig. 8 is an elevation of an alternative form of the switch arm.

An alternate construction for the E-shaped supporting member and the bar are illustrated in Fig. 8. In this instance the E-shaped member consists of three arms 125, 127 and 129, all of equal height. The bar 131 has its lower edge 133 constructed on an angle so that when end 135 is in contact with the top of arm 129, end 137 is out of contact with the end of arm 125, and vice versa. An adjusting screw 37 is provided as before. Bar 131 may be constructed of a plurality of laminations.

It will be understood that the compensating coil 13 is constructed so as to be weaker than the main coil 11, so that the latter will overpower the former at the desired motor speed.

In some instances, it is desirable to open the phase winding at a lower motor speed when the line voltage is high. For example, such a control reduces the maximum voltage to which the condenser 95 is subjected and hence reduces the cost of said condenser. Such a modification of the line-voltage—speed curves, as compared with the curves 107, 109 and 111 in Fig. 7, is attained by strengthening the coil 13 in Fig. 2 with respect to the coil 11. This change slants said curves upwardly toward the left, instead of having them go approximately straight upwardly as in Fig. 7.

In similar fashion, by strengthening the coil 11 in Fig. 2 as compared with the coil 13 in said Fig. 2, from the relative values first described above, the curves 107, 109, 111 in Fig. 7 can be moved clockwise, thus causing the starting winding to be opened at a higher speed (and higher voltage across the condenser) at the higher line voltage.

The strengthening of coils 11 and 13 involves a factory adjustment.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. An electrical cutout for a motor having a starting phase winding and a running winding connected in parallel, comprising a first and a second coil energized from a supply line and connected in parallel relatively to each other and said motor windings, an armature influenced by both of said first and second coils, the influence of the first coil tending to move the armature to a first position and the influence of the second coil tending to move it to a second position, means of predetermined force biasing the armature to said first position, a cutout switch which when closed feeds said first coil and said starting phase winding, said armature cooperating with said switch to open the switch when the armature moves from its position as biased by the first coil, the influence of the second coil on the movement of the armature under starting conditions of the motor being initially less than the influence of the first coil plus said aiding means, and said influence of the second coil under running conditions on the motor being greater than that of said first coil plus the aiding means.

2. An electrical cutout for a motor having a starting phase winding and a running winding connected in parallel, comprising a first and a second coil energized from a supply line and connected in parallel relatively to each other and said motor windings, an armature influenced by both of said first and second coils, the influence of the first coil tending to move the armature to a first position and the influence of the second coil tending to move it to a second position, means of predetermined force biasing the armature to said first position, a cutout switch which when closed feeds said first coil and said first starting phase winding, said armature cooperating with said switch to open the switch when the armature moves from its position as biased by the first coil, the influence of the second coil on the movement of the armature under starting conditions of the motor being initially less than the influence of the first coil plus said aiding means, and said influence of the second coil under running conditions on the motor being greater than that of said first coil plus the aiding means, and an adjustable magnetic gap means between at least one of said coils and the armature adapted to vary the relative influences of said coils.

3. A cutout for the starting winding of a motor having a starting winding and a running winding, comprising a switch adapted to be connected in series with said starting winding across a power line, a first electromagnet which when energized tends to bias said switch to closed position, a second electromagnet which when energized tends to bias said switch to open position, said first electromagnet being connected in series with said switch whereby it is deenergized upon opening of said switch, said second electromagnet being adapted to be connected in parallel with said starting winding so that its bias on said switch is substantially proportional to the voltage drop across said starting winding, said switch being normally closed when said electromagnets are deenergized.

LEWIS W. BUELL.

REFERENCES CITED

The following references are of record in the file of this patent:

UNITED STATES PATENTS

| Number | Name | Date |
|---|---|---|
| 1,921,127 | Hutt | Aug. 8, 1933 |
| 2,235,537 | Schaefer | Mar. 18, 1941 |
| 384,323 | Mallett | June 12, 1888 |
| 1,606,164 | Garvin | Nov. 9, 1926 |
| 1,938,405 | Tamsitt | Dec. 5, 1933 |
| 2,021,199 | Pearce | Nov. 19, 1935 |
| 2,314,239 | Ogden et al. | Mar. 16, 1943 |
| 2,081,618 | Dunn | May 25, 1937 |